06-71 CR 3,573,940 795,729

106/84

United States Patent Office 3,573,940

Patented Apr. 6, 1971

3,573,940

FLY ASH BASED PREFORMED SUPPORT STRUCTURES

Charles F. Cockrell and Harry E. Shafer, Jr., Morgantown, W. Va., assignors to the United States of America as represented by the Secretary of the Interior No Drawing. Filed Jan. 31, 1969, Ser. No. 795,729
Int. Cl. C04b *29/02*
U.S. Cl. 106—84 7 Claims

ABSTRACT OF THE DISCLOSURE

A process of making a preformed support structure, such as brick, comprising admixing fly ash, a coarse aggregate, sodium silicate, and hydrochloric acid; shaping under pressure; drying and firing at elevated temperatures.

This invention relates to a process for the preparation of preformed support structures, such as bricks, which are made from fly ash and to the resulting products.

Fly ash, a major by-product from the combustion of pulverized coal, has become a problem of substantial proportion at coal-burning power plants. It is estimated that by 1980 approximately 28 million tons of fly ash will be produced annually. At present, the major portion of fly ash is dumped in a slurry in rapidly dwindling storage areas.

Major commercial uses for fly ash today are concrete admixture, soil stabilization, asphalt having mixes in which the fly ash acts as filler, and light weight aggregates in which the fly ash is pelletized and then sintered. These uses, however, consume only a small proportion of the fly ash produced and additional markets for the material are needed.

Fly ash has previously been used in structural materials, e.g., U.S. Patent 1,944,007 discloses a lightweight ceramic material comprising clay or fly ash, sodium silicate and boric acid; U.S. Patent 2,576,565 discloses a ceramic product, such as brick, comprising fly ash, slag and water; U.S. Patent 2,606,126 discloses a combination of rock anhydrite, a siliceous material which may be fly ash and sulfuric acid; U.S. Patent 2,691,598 discloses building materials such as bricks containing fly ash and binder; U.S. Patent 2,724,656 discloses preparation of bricks from fly ash, ashes, lime and water; U.S. Patent 2,946,112 discloses preparation of a lightweight aggregate construction material comprising fly ash, bottom ash, and sodium silicate sintered together for use in concrete and sinter blocks, etc.; U.S. Patent 3,077,415 discloses a flowable mortar comprising fly ash, sand, cement and a surface active agent.

These and other prior art products have, however, often been found to be unsatisfactory in one or more respects, e.g., low dry compressive strength, low fired compressive strength, efflorescence and scumming. Efflorescence is characterized by a gradual appearance of white deposits on the surface of what initially appeared to be a high quality finished brick. Scumming results in formation of white fluffy deposits on the surface of green, unfired products, which can cause surface crumbling and flaking, as well as fissures. These deficiencies are due to the presence of soluble minerals such as sulfates of potassium, magnesium, sodium and calcium, particularly where these minerals are present in amounts of more than about 0.3%. Efflorescence and scumming result from migration of these minerals to the surface of the product. For many years the clay industry has attempted to solve the water soluble mineral problem by adding barium carbonate in various amounts to render the efflorescing minerals insoluble. Barium chloride and sodium carbonate have also been used in conjunction with barium carbonate where efflorescence is severe. However, in addition to being high in cost ($100–$120 per ton), the addition of barium carbonate or other additives does not always completely alleviate the scumming and efflorescence problem in the case of fly ash-based structural materials.

It has now been found, according to the present invention, that the above problems may be overcome and a product of superior green strength and fired strength obtained by the addition of hydrochloric acid to mixes employed in the preparation of the fly ash-based materials.

The process of the invention is particularly applicable where a coarse aggregate is used in combination with fly ash and sodium silicate as the main ingredients for a preformed support structure such as brick. The coarse aggregate, such as sand, mineral wastes from coal preparation plants, bottom-removed ash wastes from coal burning power plants, products of such wastes and mixtures thereof, acts as an agent to increase workability and to decrease fissuring of the preformed product by providing a path for moisture release. This enables the use of a combination of low cost materials in conjunction with modest forming pressures to produce a superior structural product.

The coarse aggregate may also consist of scrap from structural products previously prepared according to the method of the invention, i.e., fly ash-coarse aggregate-sodium silicate products. This scrap may result from preparation of oversized or undersized products. Such materials are commonly known as grog and in the present specification and claims will, therefore, be referred to as fly ash grog.

In the practice of this invention fly ash, a coarse aggregate having a particle size of about 8 to 100 mesh, preferably about 8 to 30 mesh, the hydrochloric acid and sodium silicate solution (about 37 to 55 percent solution having a specific gravity varying from about 40° to 60° Baumé and a sodium oxide to silica ratio of about 1:3.30 to 1:1.87) are mixed together to form pellets or a homogeneous mass. Water may be added to obtain a desired workability of the mix. The mixture is then formed into brick shapes under pressures preferably ranging from about 700 to 1100 p.s.i.g., and the brick-shaped product hardened by air-drying and firing to temperatures preferably ranging from about 980° to about 1150° C.

Hydrochloric acid has been found to give uniquely superior results in improving dry and fired compressive strength as well as eliminating scumming and efflorescence, while having no adverse effect on the finished product. Other acids have proved inefficient or totally inoperative. Sulfuric acid, for example, has not proved to be beneficial, probably due to resulting increase in soluble sulfur content of the mix, which, as discussed below, generally has an adverse effect on the product.

The hydrochloric acid is used in an amount to lower the pH of the mixture to about 3 to 7, preferably about 4 to 6, thereby effecting reaction with the materials that are responsible for scumming and efflorescence. The acid is generally used in an amount of about 0.2 percent to about 4.0 percent, preferably about 0.2 to 2.0 percent of the mixture. The optimum amount will vary widely with the types and amounts of the other ingredients of the composition and is best determined experimentally.

Optimum proportions of other ingredients will vary considerably according to the size and shape of the product, desired breaking strength, bulk, density, method of hardening, forming pressure, etc., and are also best determined experimentally. By employing, on a dry basis, from about 55 to 80 percent fly ash, about 10 to about 40 percent coarse aggregate, and about 1 to about 8 percent sodium silicate as starting ingredients, a final product possessing very desirable properties can be produced. A product made from (dry basis) about 70 to about 75 percent fly ash, about 20 to about 30 percent coarse aggregate and about 1 to 3 percent sodium silicate has very high compressive strength. Whatever the proportion of starting ingredients, the final product will also generally contain water ranging from about 8 to about 12 percent of the total product weight, the particular amount depending on the initial concentration of the sodium silicate solution and the method employed for mixing and forming. An additional advantage of the process of the invention is that sodium silicate consumption is often reduced by as much as 50 percent, thus achieving a considerable saving in cost. For example, use of hydrochloric acid results in reduction of sodium silicate from about 3 percent to 1.5 percent and less with some fly ashes.

Optimum values for other variables such as the composition and particle size of fly ash, concentration of sodium silicate solution, type and particle size of the coarse aggregate, forming pressure, method of hardening etc., may vary considerably and are best determined empirically.

The following examples will serve to more particularly illustrate the invention:

EXAMPLES 1–11

These examples illustrate the preparation and properties of the prior art products. In these examples eight different wet bottom ashes (samples 1–8) from widely distributed geographic areas were employed in preparation of fly ash-based bricks. Samples 9–11 were made from blends of two of these original eight fly ashes. Each ash was crushed and introduced into batches in sizes ranging from minus 8 to minus 20 mesh. Ninety-eight and one-half percent of the fly ash particles ranged in size from 1.1 to 43.6 microns with an average median particle size of 7 microns. The water soluble mineral content of the fly ashes was determined by shaking an amount of fly ash in distilled water equivalent to one percent of the weight of the water for a period of one hour, followed by analysis of the filtrate for mineral content. Water soluble sulfur content was determined from this same filtrate.

These fly ashes were then used in preparation of bricks according to the following procedure:

Fly ash was mixed for about five minutes, to ensure homogeneity, with bottom ash that was generated by the slagging type cyclone boiler. Thus, the admixed bottom ash was in a highly glass state because the coal ash had become molten and attained a sufficiently low viscosity to run from the cyclone boiler during combustion of the coal. A Muller-type mixer was employed. The particle size of the bottom ash was from about 10 to about 100 Tyler mesh. Sodium silicate solution having an original specific gravity of about 45° Baumé, a sodium oxide to silica ratio of approximately 1:3.00 and containing about 41 percent solids was admixed with water to give a resultant solution having a specific gravity of 27° Baumé. This solution was then added to the dry fly ash-bottom ash mix and mixing continued for five more minutes.

Each of the resultant fly ash-bottom ash-sodium silicate mixtures were then formed into brick shapes under pressures ranging from about 700 to about 1100 p.s.i.g. by means of a floating die. To dry the brick specimens, air-drying and firing was employed. Firing was accomplished in an electric furnace and a 27 cubic foot gas-fired kiln wherein the specimens were slowly heated to a temperature of about 1100° C. in a period of 8 to 30 hours, maintained at this temperature for 2 to 6 hours, and then gradually cooled to room temperature.

Each final brick product was tested in accordance with ASTM method C67–60 entitled Standard Methods of Sampling and Testing Brick. Results are shown in Table 1 which gives to total water soluble mineral content of each fly ash and the dry compressive strength of the resulting green bricks. Thus, from Table 1 it is apparent that as the water soluble mineral content increases from only 1.27 to 2.52 percent the dry compressive strength of resulting green brick experiences an abrupt lowering from a favorable high of 826 pounds per square inch to an unworkable low which closely approaches zero. Above a water soluble mineral content of approximately 2½ percent, the breaking strength continues to approach zero. At this high 2½ percent level the falling apart of most green fly ash based brick becomes visibly apparent. As moisture loss by drying continues, the bricks generally crumble or are so fissured that they fall apart when handled.

TABLE 1.—THE WATER SOLUBLE MINERAL CONTENT OF VARIOUS ASHES ARRANGED ACCORDING TO INCREASING MAGNITUDE AND THE DRY COMPRESSIVE STRENGTH OF SUBSEQUENTLY FORMED GREEN BRICK

| | Mineral content, percent weight | Dry compressive strength, pounds per square inch |
|---|---|---|
| Fly ash sample number: | | |
| 3 | 1.27 | 826 |
| 2 | 1.36 | 745 |
| 1 | 1.51 | 650 |
| 9 | 1.58 | 477 |
| 10 | 1.67 | 210 |
| 11 | 1.73 | 167 |
| 6 | 1.78 | 109 |
| 4 | 2.52 | Nil |
| 5 | 3.16 | Nil |
| 8 | 3.73 | Nil |
| 7 | 6.63 | Nil |

Table 2 shows how the previous green brick test results can be related to soluble sulfur content. The loss of dry compressive strength is associated with increases in soluble sulfur content and follows the same general trend which is evident when the soluble mineral content is increased (compare Table 1 with Table 2). Thus, it is apparent that for these fly ashes the presence of small quantities of water soluble sulfur is associated with undesirable reductions in dry compressive strength which are comparable to those caused by the presence of much larger quantities of water soluble minerals. It is important to note, however, that the significance attributed to water soluble sulfur content and its undesirable effect on dry compressive strengths may not extend to all fly ashes. This relationship may be indirect and may exist because of a correlation between the soluble sulfur and soluble mineral content in these tests. Thus, the quantity of water soluble minerals and probably the quantity of water soluble sulfur, which are contained in fly ash, become important factors in the destructive lowering of dry compressive strength.

TABLE 2.—THE SOLUBLE SULFUR CONTENT OF VARIOUS FLY ASHES ARRANGED ACCORDING TO INCREASING MAGNITUDE AND DRY COMPRESSIVE STRENGTH OF THE SUBSEQUENTLY FORMED GREEN BRICK

| | Water soluble sulfur content, percent weight | Dry compressive strength, pounds per square inch |
|---|---|---|
| Fly ash sample Number: | | |
| 2 | 0.0557 | 745 |
| 3 | 0.0772 | 826 |
| 1 | 0.1629 | 650 |
| 9 | 0.1767 | 477 |
| 10 | 0.1907 | 210 |
| 11 | 0.2045 | 167 |
| 6 | 0.2185 | 109 |
| 4 | 0.2527 | Nil |
| 5 | 0.3428 | Nil |
| 8 | 0.7269 | Nil |
| 7 | 1.2550 | Nil |

EXAMPLES 12–23

These examples illustrate the procedures and products of the present invention. In these examples the procedure was essentially the same as that of Examples 1–11 except that:

(1) 23° Baumé hydrochloric acid was admixed with one-half the water normally added to the sodium silicate solution.

(2) The resultant hydrochloric acid solution was then added to the dry fly ash-bottom ash mix and mixing continued for five minutes (in the Muller-type mixer).

(3) The sodium silicate solution was admixed with one-half the water normally used. This resultant solution was then added to the moist fly ash-bottom ash-hydrochloric acid-water mix and mixing continued for five additional minutes to give a total mixing time of 15 rather than 10 minutes. The purpose of the additional five minutes mixing prior to the addition of the sodium silicate solution was to allow the hydrochloric acid and minerals that are responsible for scumming and efflorescence to fully react so that there would be essentially no reaction between the hydrochloric acid and sodium silicate.

The amount of acid added is given in Table 3. Amounts of sodium silicate were also varied (Table 3) to illustrate the effect of the acid in enabling the use of smaller amounts of sodium silicate. Results, i.e., dry and fired compressive strengths are also given in Table 3.

TABLE 3.—THE EFFECT ON SODIUM SILICATE CONSUMPTION AND BREAKING STRENGTH OF ADDITIONS OF HYDROCHLORIC ACID TO HIGH SOLUBLE SALT CONTENT FLY ASH BASED BRICK

| Fly ash sample number | Batch designation | Hydrochloric acid, percent weight | Sodium silicate (45° Baumé), percent weight | Dry compressive strength, pounds per square inch | Fired compressive strength, pounds per square inch |
|---|---|---|---|---|---|
| 7—(6.63% soluble salt content) | 1A | 3.87 | 2.19 | 812 | 5,625 |
| | 2A | 3.87 | 1.09 | 3,000 | 5,063 |
| | 3A | | 2.19 | Nil | |
| | 1B | 1.97 | 2.19 | 875 | 6,125 |
| | 2B | 1.97 | 1.09 | 3,375 | 7,200 |
| | 3B | | 2.19 | Nil | |
| 8—(3.73% soluble salt content) | 1C | 0.40 | 2.99 | 275 | 7,350 |
| | 2C | 0.40 | 1.48 | 412 | 5,563 |
| | 3C | | 2.99 | Nil | |
| | 1D | 0.20 | 2.99 | 368 | 7,663 |
| | 2D | 0.20 | 1.48 | 470 | 7,788 |
| | 3D | | 2.99 | Nil | |

As will be seen from the data of Table 3, the addition of 0.2 to 3.87 percent hydrochloric acid to each of the unsatisfactory batches 3A, 3B, 3C and 3D produced brick of high quality with dry compressive strengths ranging from 275 to 875 pounds per square inch and with fired compressive strengths ranging from 5625 to 7663 pounds per square inch. This favorable gain is evident in batches 1A, 1B, 1C and 1D. Examples demonstrating the economic potential of hydrochloric acid additions are presented in batches 2A, 2B, 2C and 2D. In each of these batches the sodium silicate addition to the mix was decreased by approximately one-half (from 2.19 to 1.09 and from 2.99 to 1.48) with the result that (1) dry compressive strength increased in all tests and (2) fired compressive strength either increased or decreased from previous levels. Increased values for fired compressive strength are evident from a comparison of batches 1B and 2B and batches 1D and 2D, while decreased values are evident from a comparison of batches 1A and 2A and batches 1C and 2C. Regardless of the direction of changes in the fired compressive strength, however, all of these batches exceeded the 3000 pounds per square inch minimum which is a requirement for a superior grade brick classification.

What is claimed is:

1. A process for manufacturing a preformed support structure comprising the following sequence of steps:

(1) forming a mixture of fly ash, a coarse aggregate and hydrochloric acid solution in an amount sufficient to react with a major portion of soluble minerals present in the mixture, but not substantially in excess of the amount necessary to react with said soluble minerals, (2) continuing the mixing for a period of time sufficient to allow reaction between the acid and said soluble minerals, (3) admixing the resulting mixture with a solution of sodium silicate, (4) compressing the resulting admixture at an elevated pressure to form a shaped structure, and (5) drying and firing said shaped structure to harden it and form said preformed support structure; the ingredients being employed in proportions, on a dry basis, of about 55 to about 80 percent fly ash, about 10 to about 40 percent coarse aggregate, about 1 to about 8 percent sodium silicate and about 0.2 to 4.0 percent hydrochloric acid.

2. The process of claim 1 in which the coarse aggregate is selected from the group consisting of sand, mineral wastes from a coal preparation plant, bottom-removed ash wastes from a coal burning power plant, aggregates produced from both of said wastes, pelletized fly ash, extruded fly ash, fly ash grog and mixtures of said coarse aggregates.

3. The process of claim 1 in which the ingredients are employed in proportions, on a dry basis, of about 70 to about 75 percent fly ash, about 20 to about 30 percent coarse aggregate, about 1 to 3 percent sodium silicate and about 0.2 to 2.0 percent hydrochloric acid.

4. The process of claim 1 in which said coarse aggregate has a particle size ranging from about 10 to about 100 Tyler mesh.

5. The process of claim 1 in which the forming pressure is from about 700 to about 1100 p.s.i.g.

6. The process of claim 1 wherein said compression step comprises forming said admixture into a brick shape.

7. The structure produced by the process of claim 1.

References Cited

UNITED STATES PATENTS

| | | | |
|---|---|---|---|
| 1,944,007 | 1/1934 | Hobart | 106—40 |
| 2,521,839 | 9/1950 | Feagin | 106—84 |
| 2,833,659 | 5/1958 | Bauer | 106—71 |

JAMES E. POER, Primary Examiner

U.S. Cl. X.R.

106—69, 71